United States Patent
Wittkampf et al.

(10) Patent No.: US 11,908,205 B2
(45) Date of Patent: Feb. 20, 2024

(54) METHOD AND SYSTEM FOR INCREASING SAFETY OF PARTIALLY OR FULLY AUTOMATED DRIVING FUNCTIONS

(71) Applicant: Continental Automotive GmbH, Hannover (DE)

(72) Inventors: Kai Alexander Wittkampf, Bad Soden-Salmuenster (DE); Sandro Syguda, Friedrichsdorf (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 7 days.

(21) Appl. No.: 17/151,449

(22) Filed: Jan. 18, 2021

(65) Prior Publication Data
US 2021/0279483 A1 Sep. 9, 2021

(30) Foreign Application Priority Data
Mar. 9, 2020 (DE) ...................... 10 2020 202 964.4

(51) Int. Cl.
*G06V 20/56* (2022.01)
*G06F 18/22* (2023.01)
*G06V 10/75* (2022.01)

(52) U.S. Cl.
CPC ............ *G06V 20/588* (2022.01); *G06F 18/22* (2023.01); *G06V 10/75* (2022.01)

(58) Field of Classification Search
CPC ... G06V 20/588; G06K 9/6215; G06K 9/6201
See application file for complete search history.

(56) References Cited

U.S. PATENT DOCUMENTS 5,337,245 A * 8/1994 Matsuzaki ......... G01C 21/3697
340/988
6,282,478 B1 * 8/2001 Akita .................... B60K 31/00
303/167

(Continued)

FOREIGN PATENT DOCUMENTS

DE 102016007567 12/2017
DE 102016214045 2/2018

(Continued)

OTHER PUBLICATIONS

German Search Report for German Patent Application No. 10 2020 202 964.4, dated Oct. 16, 2020, 8 pages, German Patent and Trademark Office, Muenchen, Germany, with English partial translation, 7 pages.

*Primary Examiner* — Solomon G Bezuayehu
(74) *Attorney, Agent, or Firm* — Buchanan Ingersoll & Rooney PC

(57) ABSTRACT

The invention relates to a method for increasing the safety of driving functions in a partially automated or fully autonomous vehicle, including the following steps:
 capturing (S1) an environment image or a sequence of environment images by means of at least one surroundings detection sensor (2),
 detecting (S2) driving lane boundaries in the environment image or the sequence of environment images,
 determining (S3) a driving lane course based on the detected driving lane boundaries;
 retrieving (S4) a further driving lane course from a data source;
 checking the plausibility (S5) of the determined driving lane course by verifying a matching of the driving lane courses;
 identifying (S6) a degree of matching;
(Continued)

setting (S7) a confidence value based on the degree of matching;

deciding (S8) whether the determined driving lane course is provided to a driving function.

4 Claims, 2 Drawing Sheets

(56) References Cited

U.S. PATENT DOCUMENTS

| | | | | |
|---|---|---|---|---|
| 8,190,361 | B2* | 5/2012 | Lee | G01C 21/3415 701/414 |
| 8,824,826 | B2* | 9/2014 | Lukac | G06T 5/002 382/260 |
| 10,210,631 | B1* | 2/2019 | Cinnamon | G06T 15/503 |
| 10,739,152 | B2* | 8/2020 | Fryer | G08G 1/20 |
| 10,902,521 | B1* | 1/2021 | Kanevsky | G06Q 40/08 |
| 2004/0064241 | A1* | 4/2004 | Sekiguchi | B60K 31/0008 701/96 |
| 2006/0241854 | A1* | 10/2006 | Tu | G01C 21/3446 340/995.19 |
| 2007/0118276 | A1* | 5/2007 | Suzuki | G01C 21/3415 701/414 |
| 2009/0222203 | A1* | 9/2009 | Mueller | G01C 21/3632 701/431 |
| 2010/0082238 | A1* | 4/2010 | Nakamura | G01C 21/32 701/532 |
| 2011/0046843 | A1* | 2/2011 | Caveney | G08G 1/161 701/31.4 |
| 2013/0063595 | A1* | 3/2013 | Niem | B60W 30/18145 348/148 |
| 2013/0070318 | A1* | 3/2013 | Byun | H02P 6/30 358/498 |
| 2014/0039716 | A1* | 2/2014 | Buerkle | B62D 15/025 701/1 |
| 2014/0379164 | A1* | 12/2014 | Joh | G01C 21/30 701/1 |
| 2015/0177007 | A1* | 6/2015 | Su | B60W 30/00 701/25 |
| 2016/0176333 | A1* | 6/2016 | Langkabel | B60Q 1/143 362/465 |
| 2016/0375908 | A1* | 12/2016 | Biemer | G07C 5/08 701/1 |
| 2017/0025017 | A1* | 1/2017 | Thomas | G06F 18/254 |
| 2017/0097241 | A1* | 4/2017 | Prokhorov | G05D 1/0088 |
| 2017/0178499 | A1* | 6/2017 | Dong | G08G 1/0125 |
| 2017/0210359 | A1* | 7/2017 | Brandin | B60W 30/09 |
| 2017/0351925 | A1* | 12/2017 | Yeh | B60R 11/04 |
| 2018/0046193 | A1* | 2/2018 | Takada | G05D 1/0276 |
| 2018/0156626 | A1* | 6/2018 | Kang | G06V 10/56 |
| 2018/0178785 | A1* | 6/2018 | Lin | G06V 10/754 |
| 2019/0063945 | A1* | 2/2019 | Liu | G01C 21/3658 |
| 2019/0101405 | A1* | 4/2019 | Feng | G08G 1/0969 |
| 2019/0111922 | A1* | 4/2019 | Nath | B60W 30/0953 |
| 2019/0145784 | A1* | 5/2019 | Ma | G05D 1/0246 701/448 |
| 2019/0179324 | A1* | 6/2019 | Rottkamp | B60W 30/12 |
| 2019/0318174 | A1* | 10/2019 | Miklos | B60W 40/072 |
| 2019/0347821 | A1* | 11/2019 | Stein | G08G 1/0112 |
| 2019/0392715 | A1* | 12/2019 | Strauß | G05D 1/0246 |
| 2020/0031335 | A1* | 1/2020 | Ohmura | B60W 50/082 |
| 2020/0082183 | A1* | 3/2020 | Liu | G06V 20/58 |
| 2020/0122717 | A1* | 4/2020 | Kim | G06V 10/75 |
| 2020/0180610 | A1 | 6/2020 | Schneider et al. | |
| 2020/0184308 | A1* | 6/2020 | Li | H02J 13/00016 |
| 2020/0247433 | A1* | 8/2020 | Scharfenberger | G06V 10/82 |
| 2020/0271453 | A1* | 8/2020 | Wang | G01C 21/30 |
| 2020/0310450 | A1* | 10/2020 | Reschka | B60W 60/0011 |
| 2020/0357138 | A1* | 11/2020 | Xiang | H04N 23/54 |
| 2020/0380383 | A1* | 12/2020 | Kwong | G06V 10/82 |
| 2021/0033416 | A1* | 2/2021 | Vladimerou | G01C 21/3658 |
| 2021/0063172 | A1* | 3/2021 | Jung | G01C 21/3691 |
| 2021/0089807 | A1* | 3/2021 | Liu | G06V 10/774 |
| 2021/0107520 | A1* | 4/2021 | Oltmann | B60W 60/0015 |
| 2021/0188356 | A1* | 6/2021 | Goto | B62D 6/00 |
| 2021/0365694 | A1* | 11/2021 | Lee | G06V 20/588 |
| 2022/0009526 | A1* | 1/2022 | Campanale | B60W 60/00274 |
| 2022/0108545 | A1* | 4/2022 | Lee | G06V 10/82 |

FOREIGN PATENT DOCUMENTS

| | | |
|---|---|---|
| DE | 102018212219 | 1/2020 |
| DE | 102018212555 | 1/2020 |
| DE | 102018131466 | 6/2020 |
| DE | 102018222227 | 6/2020 |

* cited by examiner

METHOD AND SYSTEM FOR INCREASING SAFETY OF PARTIALLY OR FULLY AUTOMATED DRIVING FUNCTIONS

CROSS REFERENCE TO RELATED APPLICATION

This application claims priority to German Patent Application No. 10 2020 202 964.4, filed Mar. 9, 2020, the contents of such application being incorporated by reference herein.

FIELD OF THE INVENTION

The invention relates to a method for increasing the safety of driving functions.

BACKGROUND

In current driver assistance systems with steering intervention, trajectories are determined, based on the road markings, which are to be sent to the steering system by corresponding signals. In this case, the lane markings are detected by sensors in the form of different camera systems. An erroneous detection can in this case only be recognized with further camera systems. If only one camera is installed, an erroneous detection of the lane marking will lead to a departure from the planned trajectory. This poses a serious safety problem, in particular when the driver is not steering themselves (hands-off).

SUMMARY OF THE INVENTION

Therefore, an aspect of the invention is to provide a method which increases the safety and robustness of driving functions.

Initial ideas involved the thought that even with a further camera, plausibility checks of detected driving lanes are not expedient. In certain situations, the cameras are equally compromised by common cause errors (shared electronic/electric errors as well as backlight, snow, rain, etc.). Aside from that, a second camera must be installed, and that is no small financial factor.

The development of a safety concept for a lane keeping function which may be used hands-off led to the increased requirements. The ASIL for derived safety goals in relation to hands-on functions necessitates additional plausibility checks of detected driving lanes. Currently, cameras on the market do not fulfill the increased integrity requirement.

According to an aspect of the invention, a method is therefore proposed for increasing the safety of driving functions in a vehicle with a degree of automation equal to or above SAE L2 in accordance with SAE J3016, including the following steps:
- capturing an environment image or a sequence of environment images by means of at least one surroundings detection sensor,
- detecting driving lane boundaries in the environment image or the sequence of environment images,
- determining a driving lane course based on the detected driving lane boundaries;
- retrieving a further driving lane course from a data source;
- checking the plausibility of the determined driving lane course by verifying a matching of the driving lane courses;
- identifying a degree of matching;
- setting a confidence value based on the degree of matching;
- deciding whether the determined driving lane course is provided to a driving function.

The surroundings detection sensor is preferably a mono or stereo camera. In the case of an aspect of this invention, driving lane boundaries are understood to be driving lane markings as well as guardrails or other elevated road boundaries such as, for example, construction site boundaries.

The driving lane course can, for example, be determined by means of keypoint regression of detection points of the driving lane detection.

The degree of matching can, for example, be a percentage of matching of the driving lane courses. Based on this percentage of matching, a confidence value can be set for the determined driving lane course. This confidence value can subsequently be compared to a previously set confidence threshold value. In this way, it can be determined whether the determined driving lane course is sufficiently reliable for a driving function, for example a lane keeping assistant, to be able to function without error or whether autonomous driving along a planned trajectory is possible.

In a preferred embodiment, the further driving lane course is retrieved from an HD map, a cloud or an infrastructure. Said data source can thus be, for example, an HD map which is generated from different current sensor data of the ego vehicle and/or further vehicles. A map may also already be stored in the system, said map being based on a previous driving in and recording of the same vehicle environment. It would also be conceivable to retrieve the driving lane course via a cloud. In this cloud, a current driving lane course could be provided, for example by other vehicles and/or by infrastructure. Alternatively or cumulatively, it would also be possible to establish a direct V2X communication with an infrastructure element. This infrastructure element can, for example, be disposed next to the driving lane and can transmit the actual driving lane course to relevant traffic participants. This is advantageous, since current and precise driving lane courses are always available for verifying the determined driving lane course in this manner.

In a further preferred embodiment, the determined driving lane course is provided to a driving function when a confidence value above a predetermined confidence threshold value is present. In this way, it is ensured that only those driving lane courses are provided which allow an error-free driving function.

Particularly preferably, a matching of curve radii is verified when the matching of the driving lane course is checked. In particular in bends, an exact knowledge of the driving lane course is important for preventing erroneous steering interventions. This way, in an advantageous manner, invertedly recognized bends or falsely recognized bends can be determined and a driving function can be controlled accordingly.

Furthermore, a warning is preferably outputted to the driver when a confidence value below a predetermined confidence threshold value is present. The warning can also be a take-over request for the driver. Alternatively or cumulatively to the warning, it would also be conceivable to provide the driving function with the retrieved driving lane course instead of with the determined driving lane course. This would be particularly advantageous for fully autonomous vehicles, since they can be configured without a steering wheel and interference by persons would thus not be possible. In this way, a fallback level would be created, thus contributing to an increase in the reliability of the entire system.

BRIEF DESCRIPTION OF THE DRAWINGS

Further advantageous configurations can be seen in the drawings, in which.

DETAILED DESCRIPTION OF THE PREFERRED EMBODIMENTS

Figure 1:
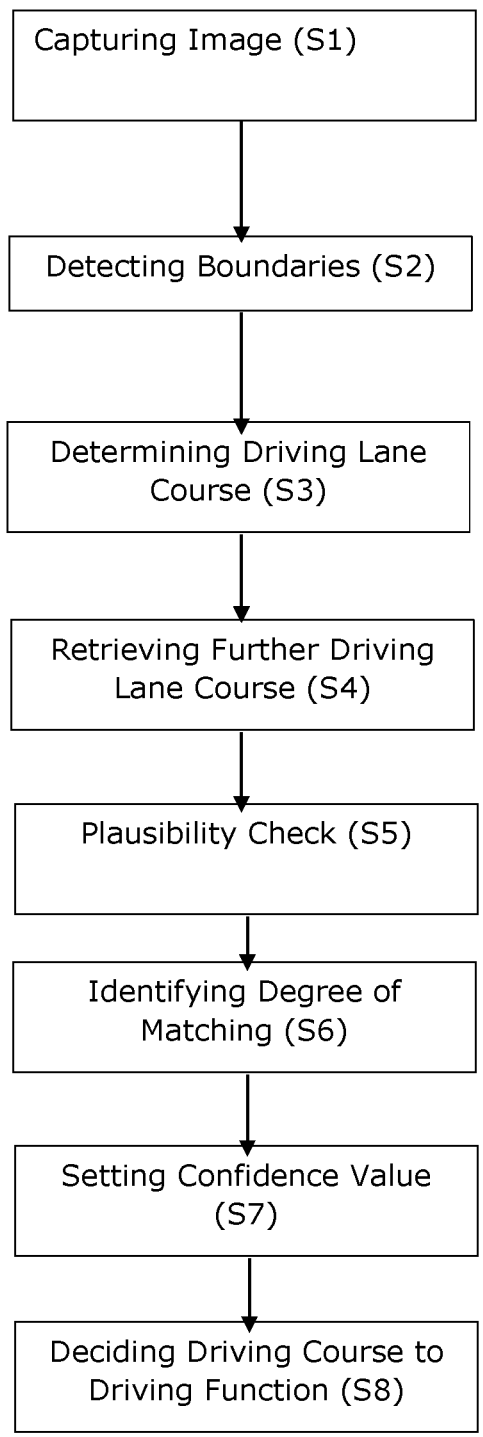
FIG. 1 shows a schematic flow chart of an embodiment of the method.

In FIG. 1, a schematic flow chart of an embodiment of the method is shown. In a first step S1, an environment image or a sequence of environment images is captured by means of at least one surroundings detection sensor. In a step S2, driving lane boundaries are detected in the environment image or the sequence of environment images. In step S3, a driving lane course is determined based on the detected driving lane boundaries. In a further step S4, a further driving lane course is retrieved from a data source. In step S5, the plausibility of the determined driving lane course is checked by verifying a matching of the driving lane courses. In a further step S6, a degree of matching is identified. In step S7, a confidence value is set based on the degree of matching. Finally, in step S8, it is decided whether the determined driving lane course is provided to a driving function.

Figure 2:
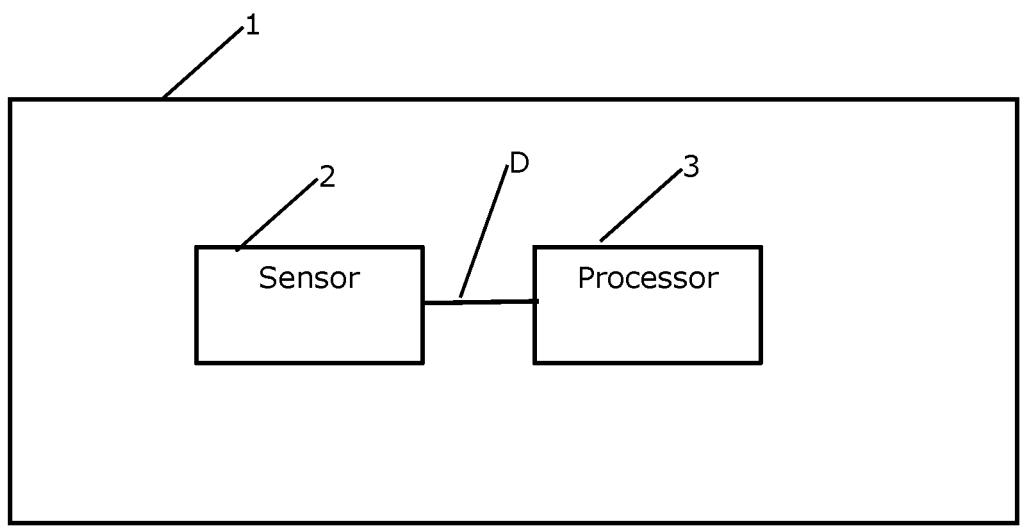
FIG. 2 shows a schematic representation of an embodiment of the system.

FIG. 2 shows a schematic representation of an embodiment of the system 1. The system 1 comprises a surroundings detection sensor 2 as well as a data processing device 3. The data processing device 3 is connected to the surroundings detection sensor 2 via a data connection D.

The invention claimed is:

1. A method for increasing the safety of driving functions in a partially automated or fully autonomous vehicle, including the following steps:
   capturing an environment image or a sequence of environment images by means of at least one surroundings detection sensor,
   detecting driving lane boundaries in the environment image or the sequence of environment images,
   determining a driving lane course based on the detected driving lane boundaries, the driving lane course including a route of the driving lane in front of the vehicle;
   retrieving a further driving lane course from a data source;
   checking the plausibility of the determined driving lane course by determining whether the determined driving lane course matches the retrieved further driving lane course;
   identifying a degree of matching of the determined driving lane course to the retrieved further driving lane course, including verifying a degree of matching of curve radii of curves of the determined driving lane course and the retrieved further driving lane course;
   setting a confidence value based on the degree of matching;
   providing the determined driving lane course to a driving function when the confidence value is above a predetermined confidence threshold value, the driving function comprising a lane keeping assistant function; and
   providing the retrieved further driving lane course to the lane keeping assistant function when the confidence value below the predetermined confidence threshold value is present.

2. The method according to claim 1, wherein the further driving lane course is retrieved from an HD map, a cloud or an infrastructure.

3. The method according to claim 1, wherein a warning is outputted to the driver when the confidence value below the predetermined confidence threshold value is present.

4. A system for increasing the safety of driving functions in a partially automated of fully autonomous vehicle, comprising at least one surroundings detection sensor as well as a data processing device, wherein the data processing device is configured for performing the method according to claim 1.

* * * * *